United States Patent Office 3,381,541
Patented May 7, 1968

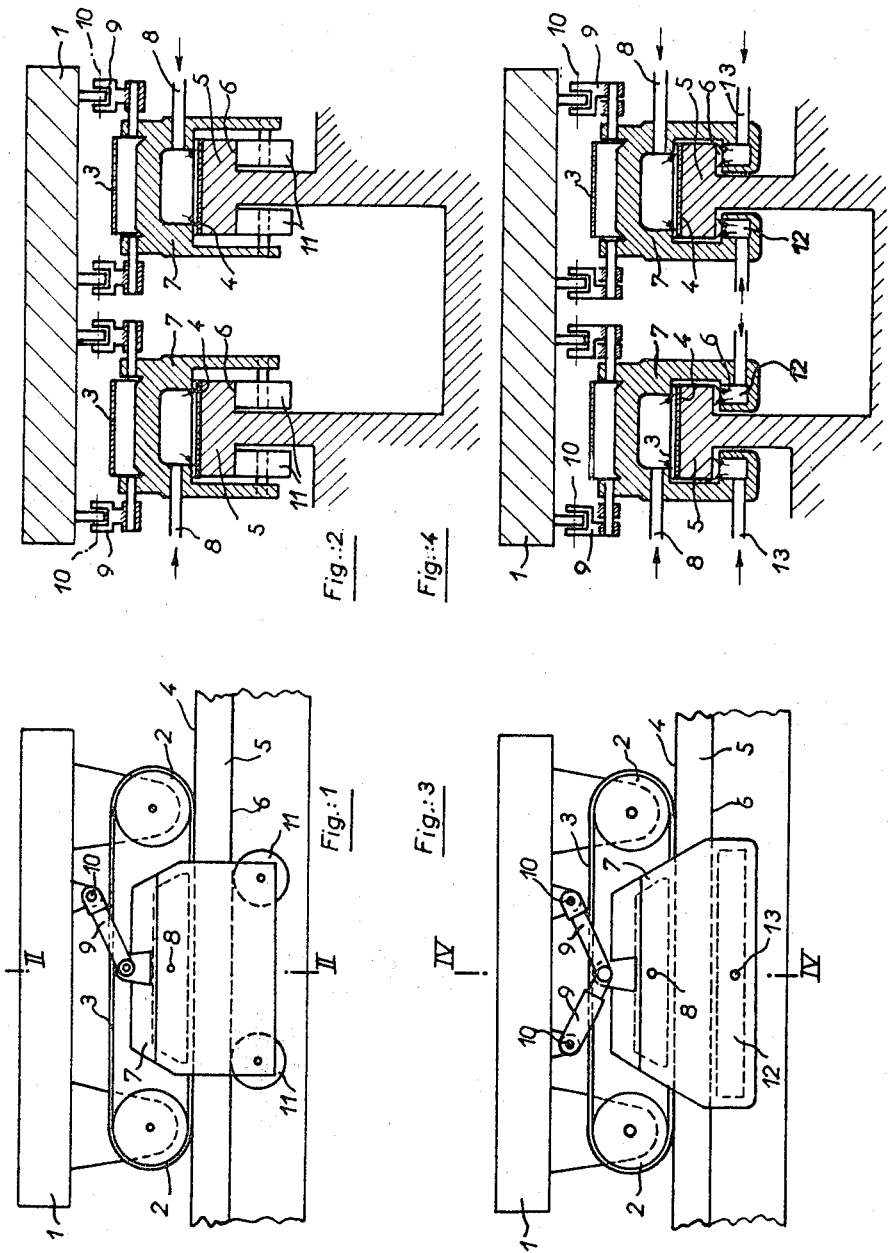

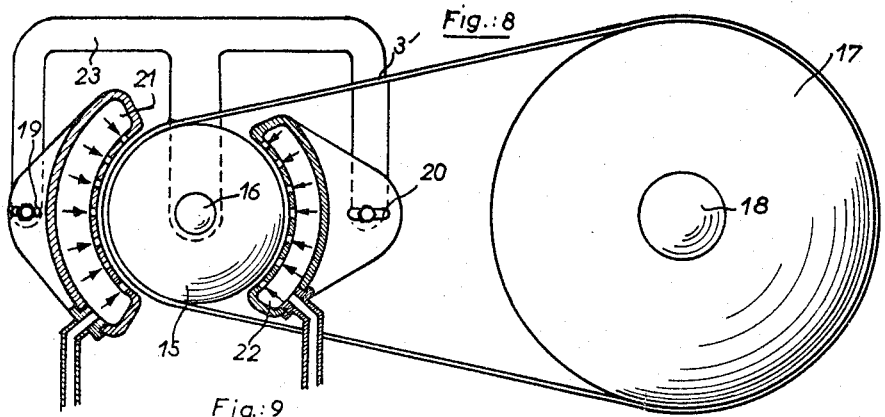
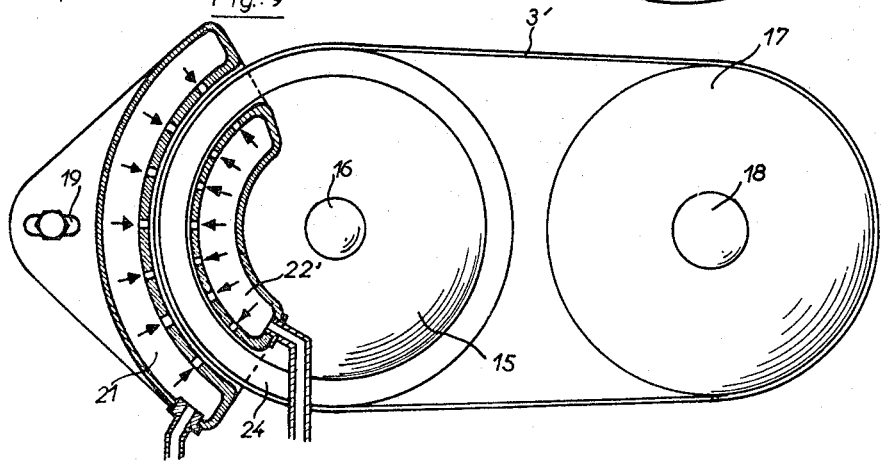
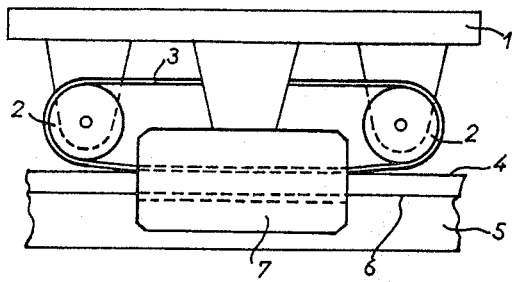
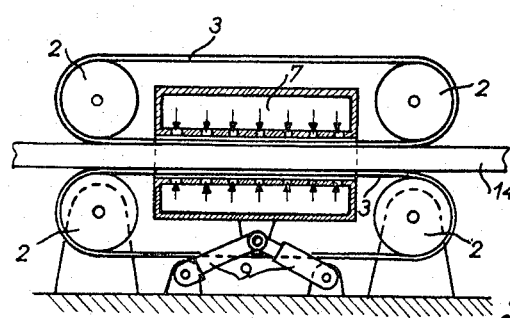

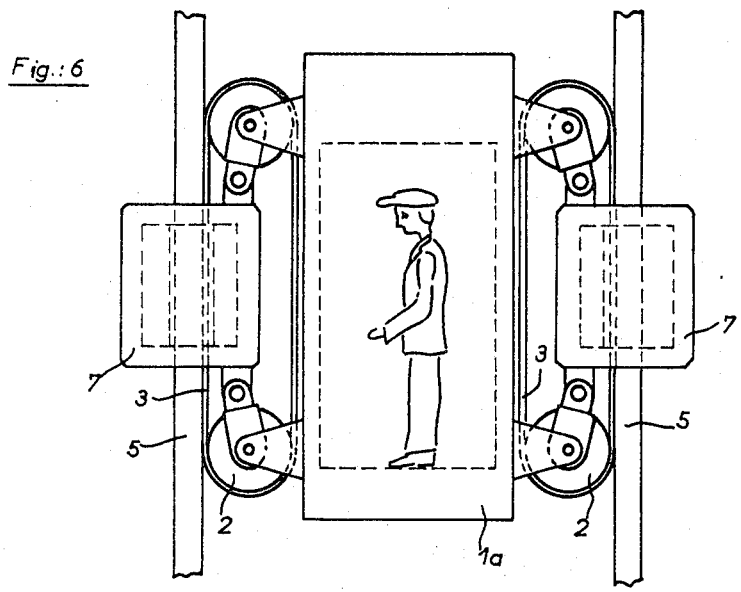
Fig.:6
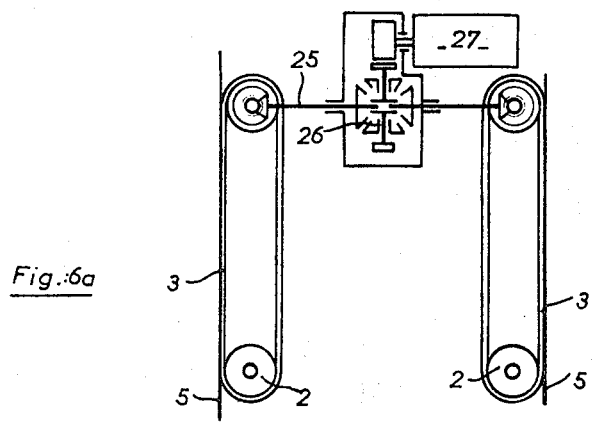
Fig.:6a
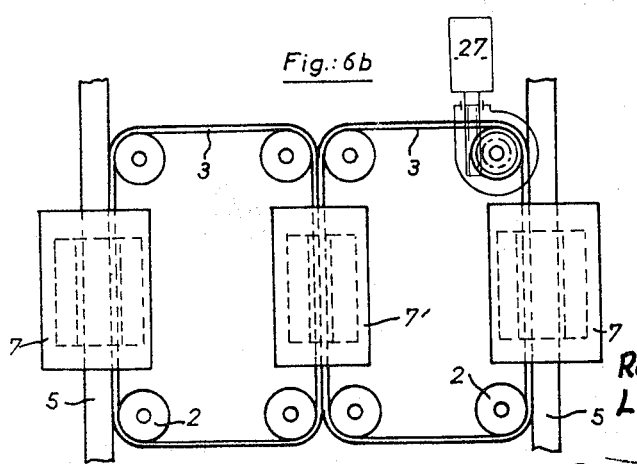
Fig.:6b
Inventors
Rémy Henri Albert Thireau
Louis Duthion
Stevens, Davis, Miller & Mosher
Attorneys

3,381,541
DEVICE FOR TRANSMISSION OF MOTION BY MEANS OF BELTS OR LIKE FLEXIBLE BANDS
Remy Henri Albert Thireau, Garches, and Louis Duthion, Paris, France, assignors to Bertin & Cie, Paris, France, a company of France
Filed Jan. 13, 1966, Ser. No. 520,527
Claims priority, application France, Jan. 15, 1965, 2,150
8 Claims. (Cl. 74—207)

ABSTRACT OF THE DISCLOSURE

An apparatus for applying a flexible band member to a backing surface formed on a solid structure, by producing at least one pressure fluid cushion on the free face of the band member remote from its operative face engaging said backing surface, and by transmitting the reaction force originating from the fluid cushion to said structure.

---

This invention relates to belts of the kind used as movement transmission or transportation means, and it relates more generally to any flexible band employed with the use of friction arising out of the contact of the band and a supporting or backing surface.

The object of the invention is to increase the adhesion of the band to such backing surface by increasing the pressure of the band on the backing surface and/or their contact surface, so that, all other things being equal, the driving capacity of the band is increased.

According to the method of this invention, this increase in the pressure of the flexible band on its backing surface is obtained pneumatically or hydraulically by means of one or more pressure fluid cushions bearing on the free surface of the band remote from the band surface in contact with the backing surface, the reaction of the fluid cushion or cushions being transmitted to the structure containing the backing surface, such transmission being produced mechanically, pneumatically, or hydraulically, in any suitable way. But, the invention also relates to apparatus for performance of the method, such apparatus comprising the combination of a moving flexible band or belt with, firstly, a backing element in contact therewith over part of the length of one of its surfaces, and secondly, means directed to produce at least one pressure fluid cushion on the surface of the band or belt remote from the backing element, means connected to the cushion producing means also being provided to transmit the reaction of said cushion means to the said backing element.

In one embodiment of such a system, the said reaction transmission means comprises a second pressure fluid cushion producing means acting on the backing element in the opposite direction to that of the first fluid cushion, the two cushions together forming a clamp to press the flexible band or belt onto the backing element.

In a variant, the reaction transmission means are formed simply by a mechanical transmission between the fluid cushion producing means on the free face of the band or belt and the backing element.

The invention may be very advantageously applied to vehicles or other mobile elements having tracks formed by endless bands or belts in contact with fixed backing surfaces formed, for example, by guide rails. According to the invention, the track is applied to the backing surface by a pressure fluid cushion. The cushion can brake and even immobilise the vehicle with a braking force which is independent of the vehicle weight when the band is immobilised in relation to the vehicle.

Of course, the opposite arrangement may be used, wherein the element in contact with the endless band is movable while the endless band is part of a fixed station acting as traction or propulsion unit for the movable element which may, for example, be a cable or a band.

The invention may also advantageously be applied to transmission belts or conveyor belts, the pressure fluid cushion or cushions giving better adhesion of such belts to their pulleys or drums.

The following description with reference to the accompanying drawings is given by way of example without any limiting force and will clearly show how the invention may be performed.

FIGURE 1 is a profile view of a vehicle arranged according to one embodiment of the invention.

FIGURE 2 is a cross-section thereof on the line II—II in FIGURE 1.

FIGURE 3 is a similar view to FIGURE 1 showing a variant embodiment of the vehicle.

FIGURE 4 is a cross-section thereof on the line IV—IV in FIGURE 3.

FIGURE 5 is a diagram of another variant embodiment of the vehicle.

FIGURES 6, 6a and 6b illustrate the application of the invention to a lift.

FIGURE 7 is a profile view of a cable traction unit according to the invention.

FIGURES 8 and 9 are diagrammatic elevations of two embodiments of the invention applied to a transmission belt.

The vehicle shown in FIGURES 1 and 2 and denoted by reference 1 comprises four driving wheels 2 provided with pneumatic tires and connected in pairs by an endless band or belt 3 which passes around the pneumatic tires. This arrangement gives a flexible suspension of the vehicle and also good driving adhesion of the belt to the wheels. The bottom run of each endless belt is in contact with the top 4 of a T-section guide rail 5 whose bottom surface is denoted by reference 6.

According to the invention, this vehicle is equipped with a "bell" carriage 7 which straddles the bottom run of each belt 3 and forms on the top free surface of each run a compressed air or other pressure fluid cushion, supply being via a conduit 8. This carriage, which is connected to the chassis of the vehicle 1 by at least one link 9 articulated at 10, has four auxiliary wheels 11 running on the bottom surfaces 6 of the rail 5. Its weight is supported at least partially by the said air cushion together with another means, for example springs attached to the chassis.

When the bell carriage receives compressed air via conduit 8, an air cushion forms above the free surface of the bottom run of the belt 3 which is thereby urged against the top surface 4 of the rail 5 by a force which may be very much greater than its weight, and which is distributed uniformly over the cushion supporting surface. The force of reaction to the lift of the air cushion is transmitted by the wheels 11 to the bottom surface 6 of the rails 5.

In a variant, these auxiliary wheels 11 are dispensed with and are replaced by the bottom pressure fluid cushions 12 (see FIGURES 3 and 4) which exert a counter-thrust with practically no friction on the bottom surfaces 6 of the rails 5, the supply of fluid arriving via the conduits 13. This system forms a kind of pneumatic clamp which presses the belt 3 and the rail 5 against one another.

In a second variant (FIGURE 5), the driving wheels 2 of the vehicle 1 are raised and space the bottom run of the belt 3 away from the top surface 4 of the rail 5 instead of applying it thereto, the pneumatic clamp formed by the cushions which apply the belt 3 to the track 5 being adequate to provide the adhesion required for operation of the belt 3 on the supporting surface 4.

In the above embodiment, only one air cushion has been shown extending from one end of the pneumatic system to the other but acting on the top free surface of the belt 3 and the same is true, where applicable, of the counter-thrust cushions 12 acting on the bottom surfaces 6 of the rails 5.

In each case, however, it would of course be possible to provide a plurality of independently supplied air cushions which are advantageously confined by preferably deformable individual side walls or alternatively a fluid mattress produced by a plurality of nozzles distributed over the surface of the elements like the pores of a permeable material.

Of course, the vehicle according to this invention may also operate in directions which are not horizontal and which may even be vertical, for example lifts, particularly for mines.

FIGURE 6 diagrammatically illustrates a lift cage 1a movable between 2 vertical guide tracks 5—5 by means of two belt systems 3—3 and pneumatic clamps 7—7.

The two belts can be synchronised by a mechanical transmission 25 equipped with a differential 26 and driven by a motor 27 as shown in FIGURE 6a, in which the air cushion systems have not been shown.

A belt 3 can also be driven by friction by means of another belt, the two belts being kept in engagement by an additional pneumatic clamp system 7' as shown in FIGURE 6b.

Of course, the fixed and movable parts of the system can be changed over within the scope of this invention. (See FIGURE 7.) A cable 14 can be driven by means of two endless belts 3—3 which are applied by two air cushions to the cable in opposite directions, the driving wheels 2 for the belt being in fixed position.

This arrangement advantageously replaces the conventional drive rollers which wear the cable out prematurely by the concentration of stresses at contact points which are necessarily spaced and localised, inevitably resulting in repeated crushing which is harmful to the cable, and this applies particularly to drilling cable lowered into oil wells or drilling or pile-driving rams (in which cases the belt could be driven continuously, the supply to the cushions could be interrupted through the down-going stroke and then the supply could be restored to the cushions through the up-going stroke).

The system according to the invention does not have the disadvantages indicated and provides both flexible and positive drive. Of course, a similar function can be fulfilled for other forms of element requiring to be driven, e.g., bands or metal sheets; also, the system can be applied to various other fields, e.g., the handling of cables and metal sheets in drawing and rolling mills, the laying or raising of underwater pipe lines or telephone cables, and so on.

In a quite different field, the new technique of flat belts gives high tensile breaking strength but they are disproportionate in relation to the co-efficient of friction of the belt on the pulley.

The present invention increases the adhesion of the belt without the need for an appreciable initial tension, because of the pneumatic clamp formed by the air cushion.

But in the embodiment shown in FIGURE 8, a flat belt 3' passes over a driving pulley 15 rotating about a spindle 16 and a driven pulley 17 rotating about a spindle 18. Fluid cushion producing means 21, 22 are mounted on a mounting 23 secured to the spindle 16, the position of the cushions being adjustable by sliding by means of slots 19, 20 and a nut locking system.

If the pulley 15 is of large enough diameter and has a rim 24 (see FIGURE 9), the reaction cushion 22' can act on the inner periphery of this rim.

Of course the reaction cushion 22 or 22' could be dispensed with by providing the necessary support by means of the spindle 16 of the pulley or its bearing by means of the mounting. It is, however, preferable to relieve the latter by use of two air cushions as indicated.

By placing the cushions on the driving and driven pulleys 15 and 17 a higher linear speed of the belt can be obtained because the centrifugal force exerted thereon can be cancelled out by the pressure of the gaseous fluid.

The invention is similarly applicable to belts or bands which are not endless and which move between a delivery system and a take-up system, drive being provided by fluid cushion pulleys described hereinbefore disposed at a suitable point of the path between the delivery system and the take-up system.

What is claimed is:

1. A motion transmission system comprising a flexible band member having an operative face and an opposite free face, driving means for moving said band member lengthwise, a solid structure having a backing surface in contact engagement with said operative face along part of the length thereof, means adjacent said free face for producing thereon a pressure fluid cushion acting in a direction to urge said operative face into closer contact engagement with said backing surface thereby inherently giving rise to a reaction force in the opposite direction, and linking means extending from said cushion producing means to said solid structure for transmitting said reaction force to said solid structure.

2. System as claimed in claim 1, wherein said linking means comprise further means adjacent a portion of said solid structure spaced from the backing surface thereof for producing a further pressure fluid cushion on said portion acting thereon substantially in said opposite direction.

3. System as claimed in claim 1, wherein said linking means comprise a mechanical connection extending between said cushion producing means and a portion of said solid structure spaced from the backing surface thereof.

4. System as claimed in claim 1, wherein said flexible band member is an endless vehicle track, and said solid structure comprises a guide rail having a side forming said backing surface and an opposite side operatively associated with said linking means to take over said reaction force.

5. System as claimed in claim 1, wherein said solid structure comprises a pulley over which said flexible band member passes.

6. System as claimed in claim 1, wherein said driving means is fixed in space, and said solid structure is movable, whereby said solid structure is driven by said flexible band member.

7. System as claimed in claim 3, wherein said mechanical connection comprises at least one roller element adapted to engage said portion.

8. System as claimed in claim 5, wherein said flexible band member is an endless transmission belt.

References Cited

UNITED STATES PATENTS

| 870,134 | 11/1907 | Sargent | 74—240 |
|---|---|---|---|
| 1,824,858 | 9/1931 | Williams | 74—240 |
| 3,073,008 | 1/1963 | McGraw | 74—240 |
| 3,118,582 | 1/1964 | Rapoza | 74—240 |

C. J. HUSAR, *Primary Examiner.*